(12) United States Patent
Kundu et al.

(10) Patent No.: US 12,149,463 B2
(45) Date of Patent: Nov. 19, 2024

(54) SOUNDING REFERENCE SIGNAL AND HYBRID AUTOMATIC REPEAT REQUEST FOR NEW RADIO-UNLICENSED

(71) Applicant: Apple Inc., Cupertino, CA (US)

(72) Inventors: Lopamudra Kundu, Santa Clara, CA (US); Bishwarup Mondal, San Ramon, CA (US); Gang Xiong, Portland, OR (US); Yongjun Kwak, Portland, OR (US); Daewon Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 648 days.

(21) Appl. No.: 17/279,948

(22) PCT Filed: Sep. 27, 2019

(86) PCT No.: PCT/US2019/053382
§ 371 (c)(1),
(2) Date: Mar. 25, 2021

(87) PCT Pub. No.: WO2020/069269
PCT Pub. Date: Apr. 2, 2020

(65) Prior Publication Data
US 2022/0038233 A1 Feb. 3, 2022

Related U.S. Application Data

(60) Provisional application No. 62/739,031, filed on Sep. 28, 2018.

(51) Int. Cl.
*H04L 5/00* (2006.01)
*H04W 74/0808* (2024.01)

(52) U.S. Cl.
CPC ....... *H04L 5/0048* (2013.01); *H04W 74/0808* (2013.01)

(58) Field of Classification Search
CPC ... H04L 5/0048; H04L 5/0051; H04L 5/0094; H04W 74/0808
See application file for complete search history.

(56) References Cited

U.S. PATENT DOCUMENTS

| 9,622,230 B2 | 4/2017 | Chen et al. |
| 9,775,149 B2 | 9/2017 | Fwu et al. |

(Continued)

FOREIGN PATENT DOCUMENTS

| CN | 102461015 A | 5/2012 |
| CN | 102668673 A | 9/2012 |

(Continued)

OTHER PUBLICATIONS

ZTE, ZTE Microelectronics, R1-1611291 "NR UL control channel structure", Nov. 5, 2016; 7 pages.

(Continued)

*Primary Examiner* — Fred A Casca
(74) *Attorney, Agent, or Firm* — Sterne, Kessler, Goldstein & Fox P.L.L.C.

(57) ABSTRACT

The present invention discloses one or more computer-readable media comprising instructions to: determine SRS resource allocation information to configure uplink resources for an SRS, the uplink resources to include a plurality of bandwidth ranges within a sounding bandwidth; perform a LET procedure in individual bandwidth ranges of the plurality of bandwidth ranges to detect at least one bandwidth range available for the SRS; and generate the SRS for transmission within the at least one bandwidth range.

19 Claims, 11 Drawing Sheets

(56) References Cited

U.S. PATENT DOCUMENTS

| | | | |
|---|---|---|---|
| 9,973,310 | B2 | 5/2018 | Noh et al. |
| 10,171,276 | B2 | 1/2019 | Stern-Berkowitz et al. |
| 10,383,103 | B2 | 8/2019 | Park et al. |
| 10,581,577 | B2 | 3/2020 | Li et al. |
| 10,812,225 | B2 | 10/2020 | Papasakellariou et al. |
| 11,197,276 | B2 | 12/2021 | Choi et al. |
| 11,646,766 | B2 | 5/2023 | Miao et al. |
| 2012/0014330 | A1 | 1/2012 | Damnjanovic et al. |
| 2012/0113967 | A1 | 5/2012 | Smith et al. |
| 2016/0344526 | A1* | 11/2016 | Fan .................. H04W 72/21 |
| 2017/0055193 | A1 | 2/2017 | Mueck et al. |
| 2017/0223675 | A1 | 8/2017 | Dinan et al. |
| 2017/0332358 | A1 | 11/2017 | Park et al. |
| 2017/0332393 | A1 | 11/2017 | Lee et al. |
| 2018/0092073 | A1 | 3/2018 | Nogami et al. |
| 2018/0115347 | A1 | 4/2018 | Yerramalli et al. |
| 2021/0400722 | A1* | 12/2021 | Grant .................. H04L 27/0006 |

FOREIGN PATENT DOCUMENTS

| | | |
|---|---|---|
| CN | 103238277 A | 8/2013 |
| CN | 104081681 A | 10/2014 |
| CN | 104380820 A | 2/2015 |
| CN | 105933099 A | 9/2016 |
| CN | 106576302 A | 4/2017 |
| CN | 106658742 A | 5/2017 |
| CN | 107046698 A | 8/2017 |
| CN | 107079477 A | 8/2017 |
| CN | 107431591 A | 12/2017 |
| CN | 107667565 A | 2/2018 |
| CN | 107852199 A | 3/2018 |
| CN | 107852751 A | 3/2018 |
| CN | 107889114 A | 4/2018 |
| WO | WO2014194460 A1 | 12/2014 |
| WO | WO 2018128296 A1 | 7/2018 |

OTHER PUBLICATIONS

Huawei, HiSilicon, R1-1808063 "HARQ enhancement in NR unlicensed", Aug. 11, 2018; 8 pages.

Hwan-Joon Kwon et al., "Licensed-Assisted Access to Unlicensed Spectrum in LTE Release 13", Dec. 14, 2016; 7 pages.

International Search Report and Written Opinion directed to related International Application No. PCT/US2019/053382, issued on Jan. 17, 2020, 13 pages.

CATT, "Further discussion on remaining issues on SRS", R1-1717820, 3GPP TSG RAN WG1 Meeting 90bis, Prague, CZ, Oct. 3, 2017, 4 pages.

Nokia et al., "Frame structure for NR-U operation", R1-1808817, 3GPP TSG RAN WG1 Meeting #94, Gothenburg, Sweden, Aug. 10, 2018, 7 pages.

Spreadtrum Communications, "Discussion on UL Signals and Channels in NR-U", R1-1808798, 3GPP TSG RAN WG1 Meeting #94, Gothenburg, Sweden, Aug. 10, 2018, 5 pages.

"Technical Specification Group Radio Access Network; Study on NR-based Access to Unlicensed Spectrum," 3GPP TR 38.889, V0.1.0, Aug. 2018; 41 pages.

* cited by examiner

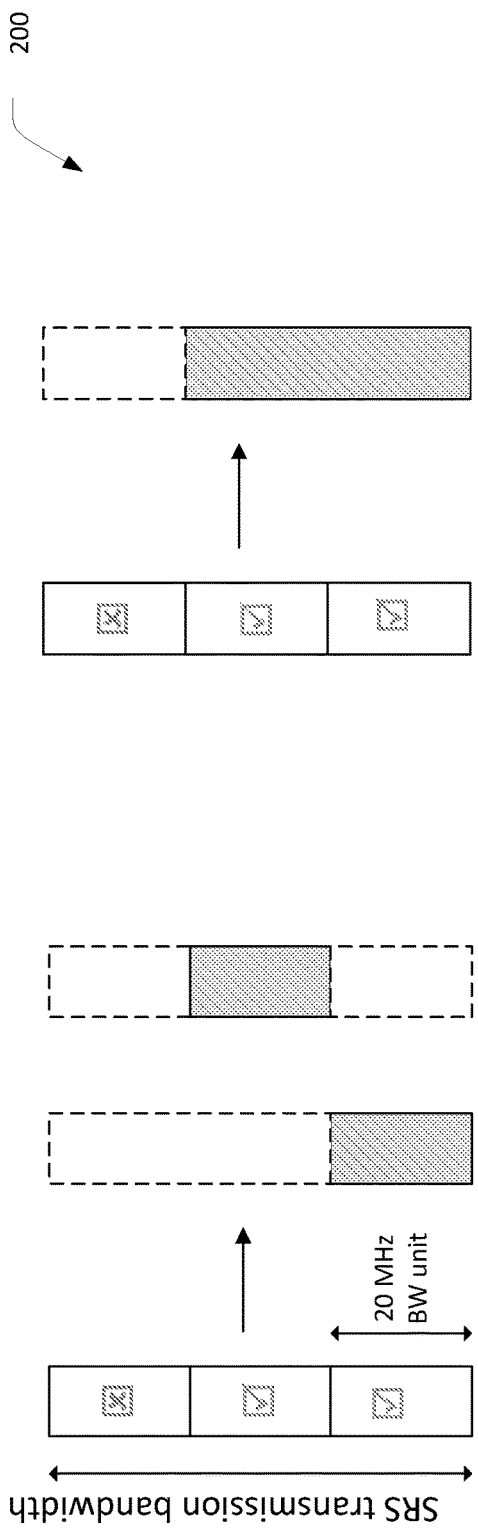
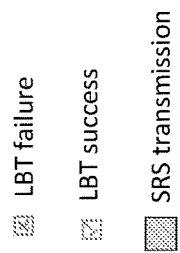
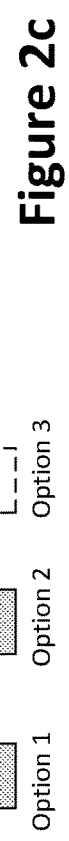
Figure 2a
Figure 2b
Figure 2c

800

```
Acquiring a channel for a COT for communication with a
plurality of UEs
804
         ↓
Configuring a first UE to transmit a first UL transmission
with LBT procedure
808
         ↓
Configuring a second UE to transmit a second UL
transmission without an LBT procedure
812
```

SOUNDING REFERENCE SIGNAL AND HYBRID AUTOMATIC REPEAT REQUEST FOR NEW RADIO-UNLICENSED

CROSS REFERENCE TO RELATED APPLICATION

The present application is a U.S. National Phase of International Application No. PCT/US2019/053382, filed Sep. 27, 2019, which claims priority to U.S. Provisional Patent Application No. 62/739,031, filed Sep. 28, 2018, entitled "Enhancement of Sounding Reference Signal for New Radio-Unlicensed." The disclosures of both of these applications are hereby incorporated by reference in their entirety.

FIELD

Embodiments of the present invention relate generally to the technical field of wireless communications.

BACKGROUND

Mobile communication has advanced remarkably in the past two decades: emerging from early voice systems and transforming into today's highly sophisticated integrated communication platforms. The next generation wireless communication system, 5G, or new radio (NR) will provide ubiquitous connectivity and access to information, as well as the ability to share data, around the globe. NR is expected to be a unified framework that will target to meet versatile and sometimes, conflicting performance criteria and provide services to vastly heterogeneous application domains ranging from Enhanced Mobile Broadband (eMBB) to massive Machine-Type Communications (mMTC) and Ultra-Reliable Low-Latency Communications (URLLC), to name a few. In general, NR will evolve based on third generation partnership project (3GPP) long term evolution (LTE)-Advanced technology with additional enhanced radio access technologies (RATs) to enable seamless and faster wireless connectivity.

Legacy LTE in Rel-13 had been to enable the operation of cellular networks in the unlicensed spectrum, via Licensed-Assisted-Access (LAA). Ever since, exploiting the access of unlicensed spectrum has been considered by 3GPP as one of the promising techniques to cope with the ever increasing growth of wireless data traffic. One of the important considerations for LTE to operate in unlicensed spectrum is to ensure fair co-existence with incumbent systems like wireless local area networks (WLANs), which has been the primary focus of LAA standardization effort since Rel. 13.

Following the trend of Third Generation Partnership Project (3GPP) Long Term Evolution (LTE) enhancements, study on New Radio (NR)-based access to unlicensed spectrum (NR-unlicensed) has been started in 3GPP Rel-15. One of the primary objectives is to identify additional functionalities that are needed for a physical (PHY) layer design of NR to operate in unlicensed spectrum. In particular, it is desirable to minimize the design efforts by identifying the essential enhancements needed for Rel-15 NR design to enable unlicensed operation, while avoiding unnecessary divergence from Rel-15 NR licensed framework. Coexistence methods already defined for LTE-based licensed access assist (LAA) context should be assumed as the baseline for the operation of NR-unlicensed systems, while enhancements over these existing methods are not precluded. NR-based operation in unlicensed spectrum should not impact deployed Wi-Fi services (data, video and voice services) more than an additional Wi-Fi network on the same carrier.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 2a-2c illustrates various options of performing listen-before-talk procedures in various bandwidth chunks and transmitting sounding reference signals in accordance with some embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
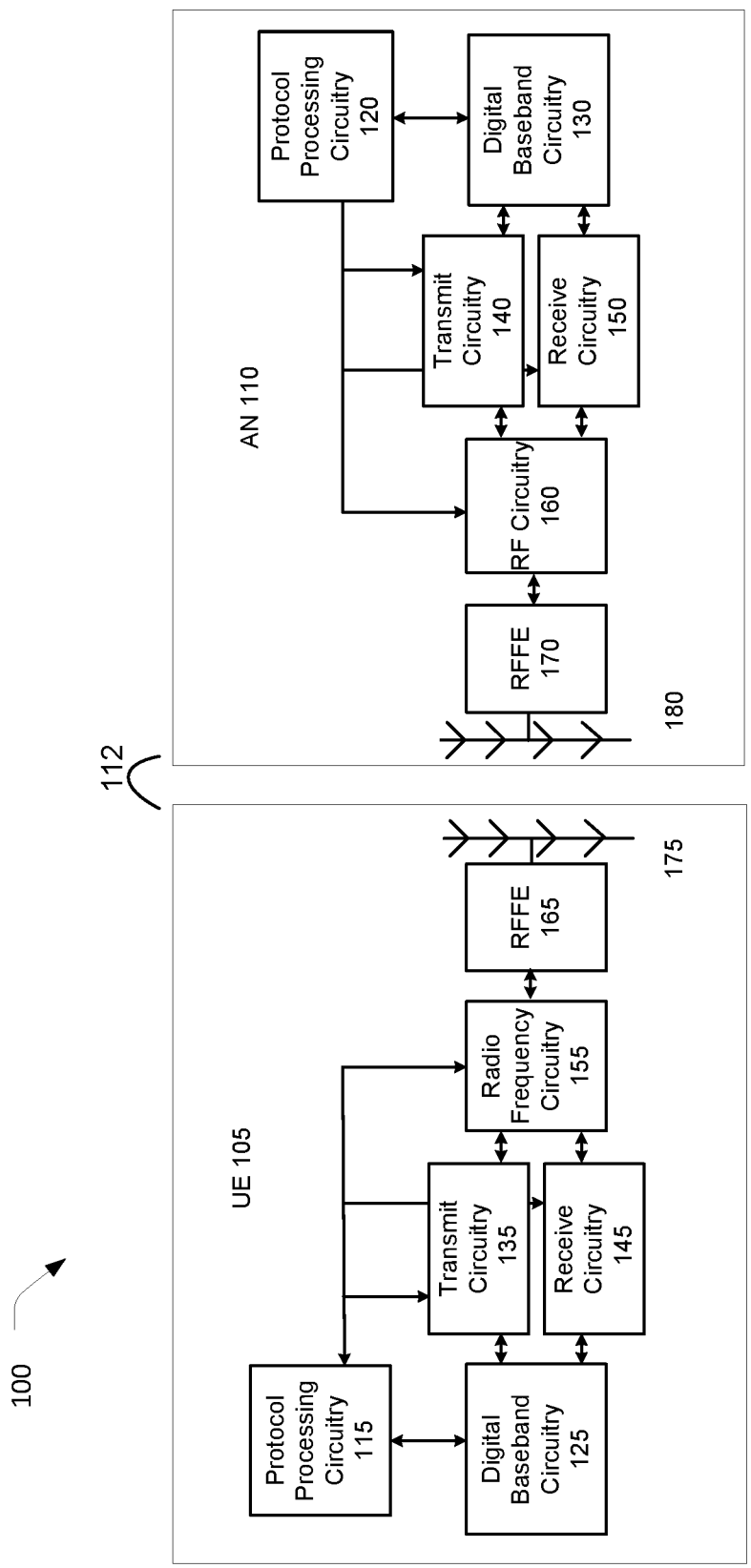
FIG. 1 illustrates a network in accordance with some embodiments.

FIG. 1 schematically illustrates an example wireless network 100 (hereinafter "network 100") in accordance with various embodiments herein. The network 100 may include a UE 105 in wireless communication with an AN 110. In some embodiments, the network 100 may be an NR or LTE network. The UE 105 may be configured to connect, for example, to be communicatively coupled, with the AN 110 via connection 112. In this example, the connection 112 is illustrated as an air interface to enable communicative coupling, and can be consistent with cellular communications protocols such as an LTE protocol, a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), Next-Generation NodeB (gNB or ng-gNB), NG-RAN node, cell, serving cell, neighbor cell, and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARQ) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

As shown in FIG. 1, the UE 105 may include millimeter wave communication circuitry grouped according to functions. The circuitry shown here is for illustrative purposes and the UE 105 may include other circuitry shown in later figures. The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 9:
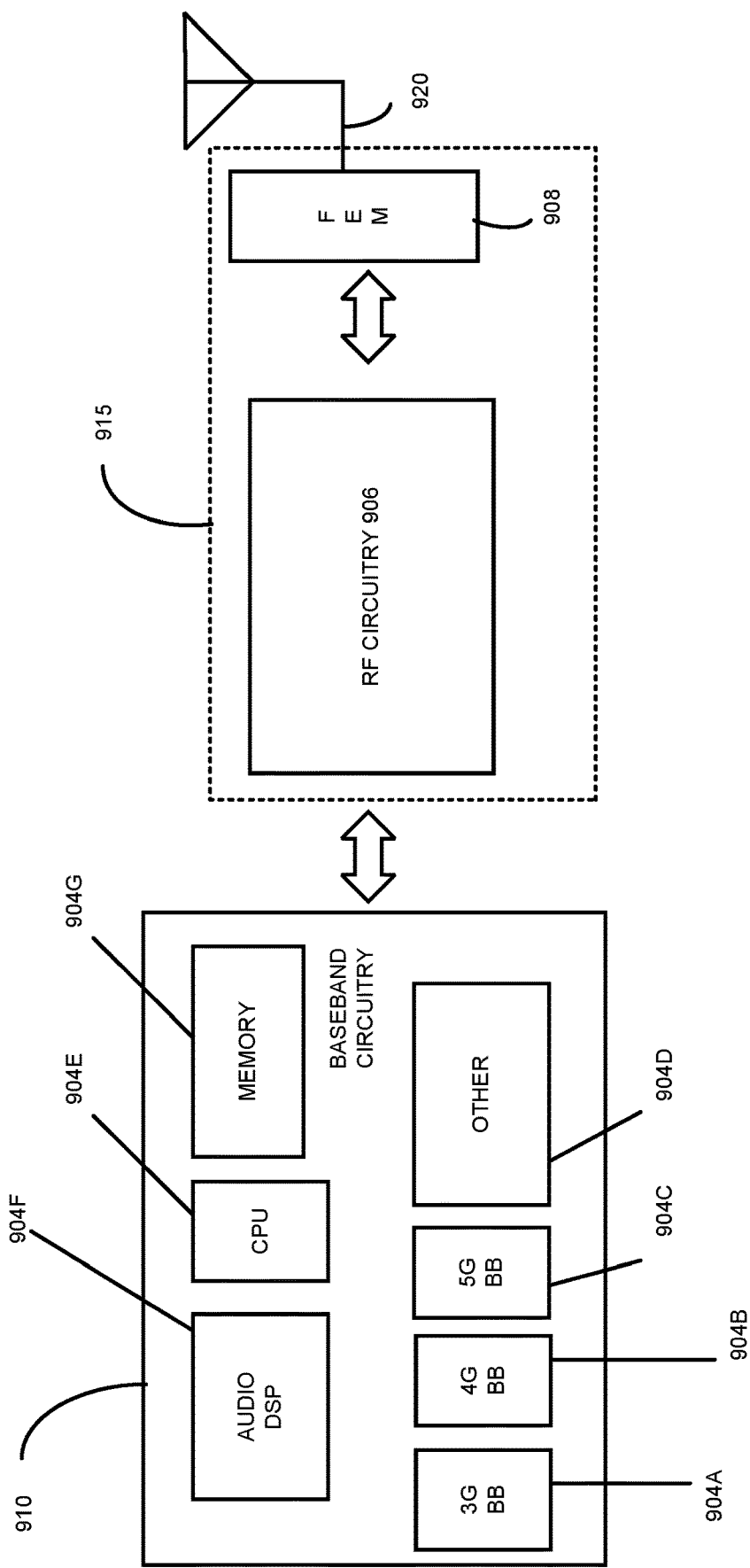
FIG. 9 depicts a device with baseband circuitry and radio frequency module in accordance with various embodiments.
Figure 10:
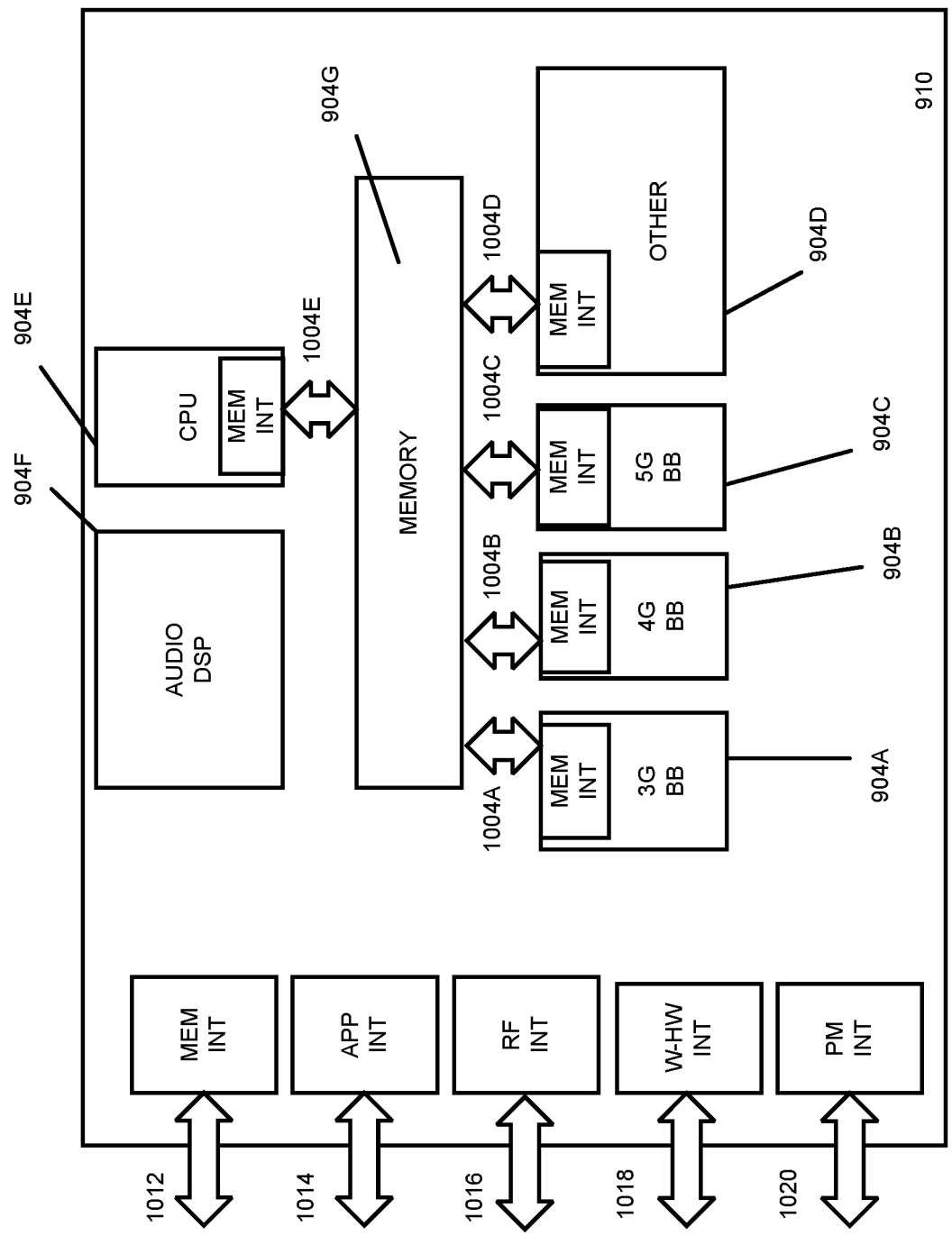
FIG. 10 depicts example interfaces of baseband circuitry in accordance with some embodiments.
Figure 11:
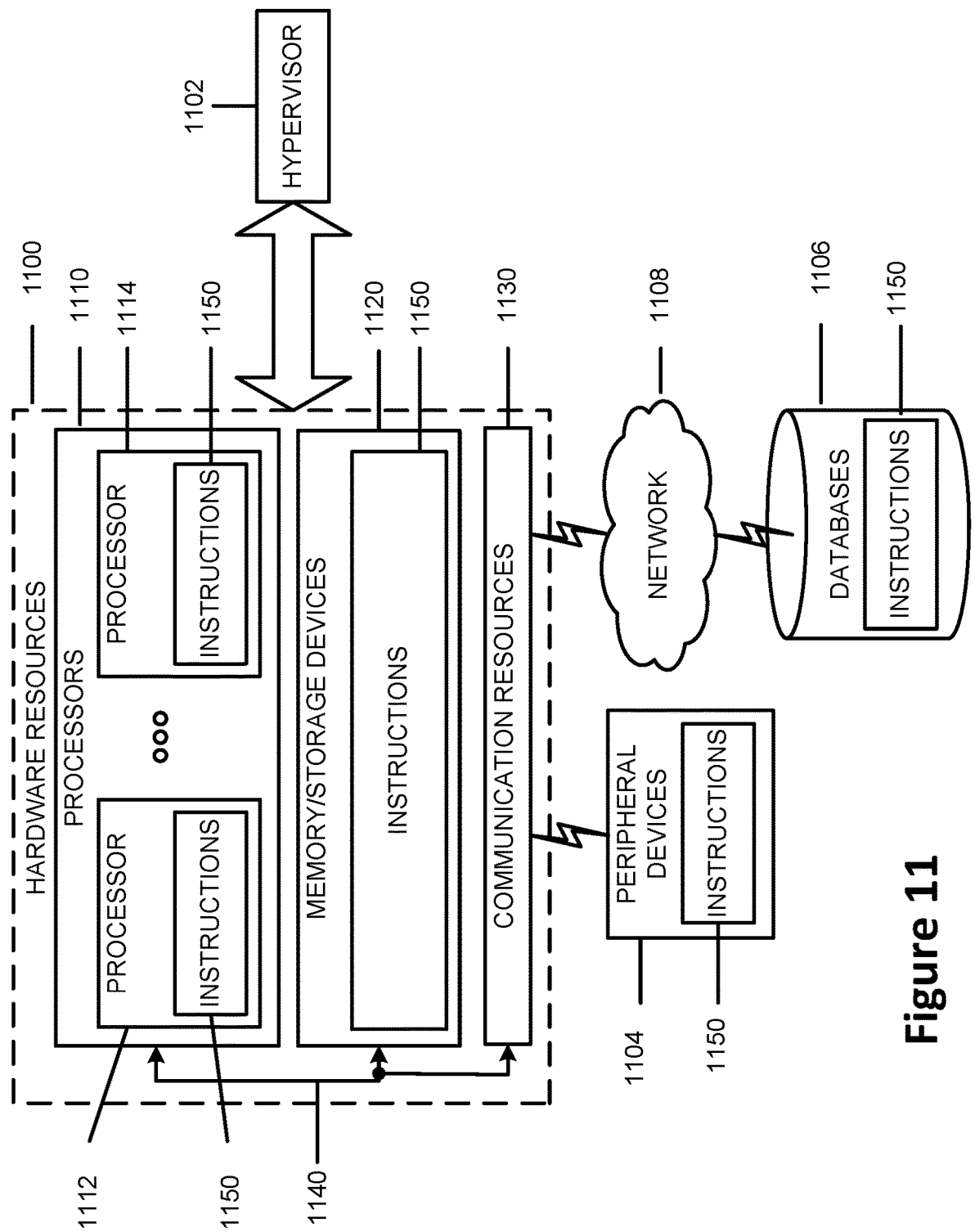
FIG. 11 is a block diagram illustrating components, according to some example embodiments, able to read instructions from a machine-readable or computer-readable medium (for example, a non-transitory machine-readable storage medium) and perform any one or more of the methodologies discussed herein.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 9, 10, and 11. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam.

In some embodiments, the UE 105 and AN 110 may communicate using NR-unlicensed (NR-U) technologies. NR-U technologies can be categorized into different modes, for example, Carrier Aggregation (CA), Dual Connectivity (DC) and Standalone (SA) modes of network operation. The channel access mechanism aspect is one of the fundamental building blocks for NR-U that may be used for any deployment options.

In some embodiments, the UE 105 may use a listen-before-talk (LBT)-based channel access mechanism. If any node, such as the UE 105, intends to transmit in unlicensed spectrum, it may first perform a channel sensing operation, which may be referred to as a clear channel assessment (CCA), before initiating any transmission. An additional random back-off mechanism may be used to avoid collisions when more than one nodes senses the channel as idle and transmits simultaneously.

Due to LBT, the performance of uplink (UL) transmissions, for example, the transmission of sounding reference signal (SRS) or hybrid automatic repeat request (HARQ) signal, can be impacted while operating in unlicensed spectrum. LBT may be performed by the UE 105 before the UE 105 transmits the SRS. For a scheduled UL transmission, in fact, multiple rounds of contentions may be imposed, since LBT may need to be performed by the access node 110 as well before sending the UL grant for SRS transmission. Resource allocation scheme for SRS transmission in NR-licensed system, which does not need to cope with such channel access related contention, therefore, may not be sufficient for SRS transmission in unlicensed spectrum.

Thus, embodiments of this disclosure provide reliability enhancements of NR-SRS resource allocation to cope with LBT in unlicensed spectrum. Embodiments include time/frequency domain SRS resource allocation scheme for reliability enhancement to cope with LBT in NR-U, and details of signaling aspect related to SRS resource allocation for NR-U. These embodiments may enhance reliability of an NR SRS transmission scheme to enable its operation over unlicensed spectrum. Various embodiments may define a new signaling mechanism for the enhancement of NR SRS resource allocation, to be used over unlicensed spectrum. Further embodiments also define new signaling mechanism for enhancing HARQ transmission, which may be used in unlicensed spectrum.

Frequency domain resource allocation for SRS transmission over NR-U spectrum

A baseline for NR-unlicensed operation may include the following: if absence of Wi-Fi cannot be guaranteed (for example, by regulation) in the band (sub-7 GHz), where NR-U is operating, the NR-U operating bandwidth may be an integer multiple of 20 MHz; and at least for band where absence of Wi-Fi cannot be guaranteed, LBT can be performed in units of 20 MHz.

In this context, the frequency domain resource allocation scheme of NR-U SRS is described in details as follows.

In some embodiments, the AN 110 may configure the UE 105 with multiple starting physical resource block (PRB) indices for SRS transmission. As one example, for an SRS transmission in NR-U scheduled over a sounding bandwidth (BW) of B MHz (B≥20 MHz), up to floor (B/20) different ranges of starting PRB indices can be configured corresponding to different 20 MHz unit bandwidth chunks within the UL active bandwidth part (BWP) of B MHz. The bandwidth chunks may be bandwidth-based SRS resource zones.

In one option, the AN 110 may use higher-layer signaling to signal a pool of SRS resources to the UE 105. The higher-layer signaling, as used herein, may be downlink control information (DCI), radio resource control (RRC) signaling, or a combination thereof. Each configured starting PRB index within this resource pool may have different allowed range of values and each of these SRS resources within the pool of resources may be configured for the same numerology (for example, for the same sub-carrier spacing (SCS)/BW configuration). For example, if N starting PRB indices are configured in the pool of resources, the value ranges for each of these PRB indices in an ascending order can be {0~X1}; {(X1,max)~ (X1,max +X1)}; {(2*X1,max) ~(2*X1,max+X1)}; . . . ; {([N−1]*X1,max)~([N−1]*X1, max +X1)}, where X1<X1,max, X1,max is the maximum number PRBs available for a BW of 20 MHz and sub-carrier spacing SCS1 and 1≤N≤Nmax. In one example, Nmax can take any integer value between 2 and floor (B/20) for a sounding BW of B MHz.

In another option, each of the SRS resources within the configured pool of resources may be configured for the same or different numerologies. As an example, if N starting PRB indices are configured in the pool of resources, the value ranges for each of these PRB indices can be {0~X1}; {(X1,max)~ (X1,max+X2)}; {(X2,max+X1,max)~(X2, max+X1,max+X3)}; . . . ; {(XN−1,max+ . . . +X1,max)~ (XN−1,max+ . . . +X1,max+XN)}, where Xi<Xi,max, Xi,max is the maximum number PRBs available for a BW of 20 MHz and sub-carrier spacing SCSi and 1≤N≤Nmax. In one example, Nmax can take any integer value between 2 and floor (B/20) for a sounding BW of B MHz. Note that, X1, X2, . . . , XN may all be same or different or a combination thereof (as one example, few of the Xi's may the same and the rest may be different) depending on the configured SCS on each of these unit of 20 MHz BW chunks over which SRS resources are configured.

In some embodiments, a UE can perform LBT over units of 20 MHz across the sounding BW (≥20 MHz) configured for SRS transmission (for example, separate LBTs over each 20 MHz chunks within sounding BW of B MHz, where B>20). Upon the LBT success (for example, an affirmative CCA), the UE 105 may transmit the SRS over one or multiple resource(s) from the pool of resources configured to the UE 105, as mentioned in the above embodiment.

In some embodiments, the UE 105 may dynamically switch the BW for SRS transmission as per the aggregated LBT outcome. FIGS. 2a-2c illustrate various options in which the UE 105 may dynamically switch SRS transmission bandwidths as per aggregated LBT outcomes in accordance with some embodiments.

A UE 105 may include successful LBT outcomes over more than one 20 MHz chunks (say, for example, over M or K chunks where, M or K>1) and the chunks may be contiguous or non-contiguous in the frequency domain. In FIGS. 2a-2c, the UE is shown as having a sounding bandwidth of 60 MHz and having successful LBT outcomes in two out of the three chunks.

As shown in FIG. 2a, option 1, the UE 105 may choose the SRS resource from the configured pool of resources such that the starting PRB index is within the first 20 MHz chunk of the contiguous M chunks (where M=2). The corresponding starting PRBs configured for the two 20 MHz chunks may have value ranges {0~X1} and {(X1,max)~ (X1,max+ X1)}, where X1 and X1,max are defined in the above embodiment. Then, the starting PRB index may be chosen from the 20 MHz chunk with starting PRB index range {0~X1}.

As a further extension, when more than one chunks (e.g., K chunks) are idle based on the outcome of LBT, the UE 105 may randomly select (or select based on a predetermined pattern) one chunk among the K chunks for SRS transmission, wherein the starting PRB and number of PRBs within the selected chunk are determined in accordance with the configured SRS resource. FIG. 2a, option 2, shows the middle section of the sounding bandwidth being used for the SRS transmission. Note that K chunks may be contiguous or non-contiguous (as shown in FIG. 2c).

FIG. 2b illustrates an option in which the UE 105 has a successful LBT outcome over more than one 20 MHz BW chunks, which are contiguous in frequency. In this embodiment, the UE 105 may dynamically switch the SRS transmission BW or sounding bandwidth to M*20 MHz and choose a starting PRB index as per the above embodiment.

FIG. 2c illustrates another option in which the UE 105 has successful LBT outcome over more than one 20 MHz BW chunks, which are non-contiguous in frequency. In this option, the UE 105 may dynamically switch the UL transmission BW to M*20 MHz and transmit multi-chunk SRS over the aggregated BW of M*20 MHz (shown in option 1), or may randomly select (or select according to a predetermined pattern) one chunk for SRS transmission (shown in options 2 or 3).

In some embodiments, a minimum sounding bandwidth can be specified by, for example, a 3GPP Technical Specification, and the network (via the access node 110) may configure frequency domain resources for SRS transmission to the UE 105 with a sounding bandwidth that would be at least equal to or larger than the pre-defined minimum sounding bandwidth when allowed by regulation. This may enable the temporal 2 MHz occupied channel bandwidth (OCB) requirement is met. As an example, the minimum sounding bandwidth for 15/30/60 KHz SCS can be 12/6/3 PRBs to meet OCB requirement.

In another example, a sounding bandwidth may be an integer multiple of a pre-defined number of PRBs, for example, 4 PRBs. In these embodiments, the minimum sounding bandwidth for 15/30/60 KHz SCS could be 12/8/4 PRBs. These embodiments can be straightforwardly extended to any numerology (for example, any SCS/BW combination) in determining the minimum sounding bandwidth for NR-unlicensed operation.

In some embodiments, the SRS can be periodic, semi-persistent, or aperiodic SRS and span up to n symbols anywhere within a subframe (as opposed to being restricted to symbols at the end of a subframe as was the case in previous networks). As one example, the SRS can be periodic, semi-persistent, or aperiodic and can span over {1, 2, 3, 4, . . . } symbols at the beginning or near the end of a subframe. All the embodiments mentioned above are applicable for frequency domain resource allocation of these SRSs described in this embodiment.

In some embodiments, if allowed by regulation, it may be sufficient for the OCB criteria to be met over n symbol duration of the SRS, rather than on each symbol. In that case, the minimum sounding bandwidth on each symbol of an n symbol SRS transmission may be less than 2 MHz. Intra-slot frequency hopping may be enabled so that the hopping bandwidth over n symbols may satisfy OCB criteria, whereas the sounding bandwidth per symbol may be less than OCB.

Time domain resource allocation for SRS transmission over NR-unlicensed spectrum In some embodiments, multiple (that is, more than one) starting symbol locations (in terms of symbol index within a slot) can be configured for SRS transmission. Thus, an LBT can be performed more than once within a slot by the UE 105 at the configured starting symbol locations, if the LBT fails in the first attempt. If LBT succeeds at any one of the starting symbol locations in time, UE can transmit SRS in the same slot.

In one option, the access node 110 may use higher-layer signaling (for example, DCI or RRC signaling) to signal a pool of SRS resources to the UE 105. Each resource within the pool may be configured with a starting symbol index that is different from the other resources within the pool. As one example, the starting symbol index within a slot may be 8, 10, 12, or any other integer less than 14. In another option, a group of resources within the pool may be configured with the same starting symbol index but different starting PRB indices, whereas another group of resources may be configured with different starting symbol indices and same/different starting PRB indices, where the starting PRB indices can be configured as the aforementioned embodiments. The group of resources configured with starting symbol index may be referred to as time-based SRS resource zones.

In embodiments, given a starting symbol, the SRS transmission can actually start at the symbol boundary and LBT may be performed right before, such that the LBT procedure ends right at the beginning of the starting symbol. Alternatively, the SRS transmission may start later, for example, after 25 μs from the starting symbol and LBT may be performed at the symbol boundary.

In embodiments, multiple ending symbol locations (in terms of symbol index within a slot) can be configured for SRS transmission. The signaling of the ending position locations can be implicitly indicated by configuring dynamically the number of OFDM symbols, or it can be RRC signaled or indicated in the DCI, or a combination thereof.

In embodiments, the UE 105 may perform puncturing on SRS transmission based on LBT outcome. In one option, the UE 105 may choose a delayed starting symbol based on the LBT outcome, but may keep the ending symbol unchanged (for example, the same ending symbol corresponding to an earlier starting symbol where the LBT failed) and apply puncturing to fit the SRS transmission within the SRS duration decided by the finally chosen starting and ending symbols. In another option, the UE 105 may choose a different ending symbol depending on the LBT outcome and whether the starting symbol is delayed or not and then apply puncturing based on the new SRS duration if desired. In this case, the UE 105 may not need to apply puncturing if the SRS duration remains the same with the new starting symbol-ending symbol set chosen based on LBT outcome as it was with the initial SRS resource configuration, prior to performing LBT. As a further extension, this delayed SRS transmission may not extend across the slot boundary.

In some embodiments, the access node 110 may configure the UE 105 with a pool of SRS resources in time and frequency domain (in the same or different bandwidth parts, in different starting symbols, or same symbol but different slots). Similar to that described above, this configuration may be performed by the access node 110 using higher-layer signaling to provide the UE 105 with the appropriate configuration information. Depending on the LBT outcome, the UE 105 may select one SRS resource from the indicated SRS resource pool for SRS transmission.

Alternatively, in embodiments the UE 105 may select one SRS resource with earliest symbol after LBT from the indicated SRS resource pool. If the indicated SRS resource pool does not include an SRS resource, which is later than the time instant for successful LBT, the UE 105 may not transmit the SRS.

It may be possible that the UE 105 may defer the SRS transmission in the next slot if the SRS resource includes the next slot as available slot for SRS transmission.

In embodiments, in the DCI scheduling/triggering SRS, a field may be used to indicate which one or more of SRS resources within the configured SRS resource pool can be selected for SRS transmission. More specifically, a bitmap may be included in the DCI for SRS resource selection. For instance, assuming three resources are configured within each SRS resource pool, the field "101" in the DCI may indicate that the first and third SRS resources within the SRS resource pools can be selected by the UE 105.

In embodiments, for systems operating in unlicensed spectrum, a parameter for starting symbol for SRS transmission may not be included in the SRS resource allocation configuration. After the LBT procedure and if the channel is idle, the UE 105 may immediately transmit the SRS. Alternatively, the UE 105 may be configured with a subset of the starting symbols for SRS transmission. After the LBT procedure and if the channel is idle, the UE 105 may transmit the SRS with the earliest starting symbol in the configured subset of the starting symbols in a slot. The UE 105 may be configured with the next slot or next K slots for SRS transmission. Further, it may be that the SRS resource does not span across a slot boundary. If an SRS resource is across a slot boundary due to the late starting symbol, the UE may drop the SRS transmission.

In some embodiments, for systems operating in unlicensed spectrum, after the LBT procedure and if the channel is idle, the UE 105 may immediately transmit the SRS. If the time just after the LBT success does not align with the symbol boundary, the UE 105 may transmit dummy signals, which meet OCB requirements, until the next earliest symbol boundary, where the next symbol is configured as SRS resources, and then transmit SRS using the configured frequency resources.

In embodiments, for systems operating in unlicensed spectrum, after the LBT procedure and if the channel is idle, in case when SRS spans more than 1 symbol, and if the LBT is in the middle of SRS transmission, the UE 105 may continue to transmit the remaining SRS. Note that this may apply for semi-persistent, periodic, or aperiodic SRS transmission. Alternatively, in case of SRS transmission for beam management, when the LBT is performed in the middle of SRS transmission and if the channel is detected as idle, the UE 105 may drop the remaining SRS.

In embodiments, the SRS can be periodic, semi-persistent, or aperiodic SRS and span up to n symbols anywhere within a subframe. Moreover, intra-slot frequency hopping can be enabled or disabled. The UE 105 may be configured with the next slot or next K slots for SRS transmission, and in that case inter-slot and/or intra-slot frequency hopping may be enabled or disabled. In all these cases, the embodiments related to time and frequency domain resource allocation for SRS transmission may be applicable.

FIGS. 3-6 describe transmission exchanges in various embodiments in which a gNB may dynamically signal to a UE whether an LBT procedure is to be used. A gNB, as used in these figures and discussion, may correspond to the AN 110 and any of the UEs may correspond to UE 105.

Figure 3:
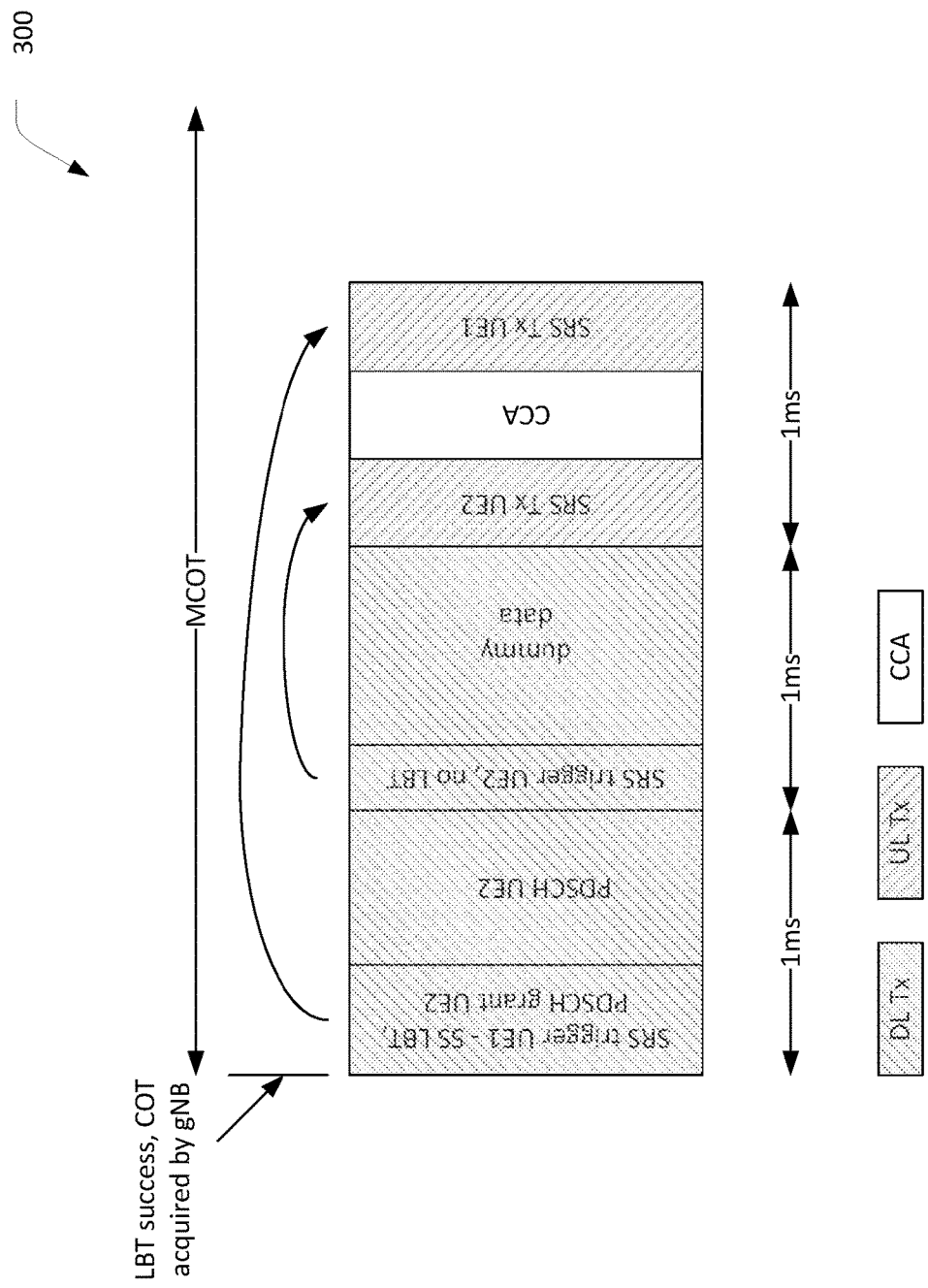
FIG. 3 illustrates a transmission exchange in accordance with some embodiments.

FIG. 3 is a transmission exchange 300 that illustrates an SRS triggering mechanism in accordance with some embodiments. In particular, the transmission exchange 300 provides an SRS triggering mechanism in which UEs are informed of the type of LBT that is associated for a particular instance of the SRS transmission.

The transmission exchange 300 may begin with a gNB successfully performing an LBT procedure, with a channel occupancy time (COT) being acquired by the gNB for a first UE (UE1) and a second UE (UE2) for DL and UL transmissions.

The COT may have an associated maximum COT (MCOT). The transmission exchange 300 may provide, to UE1 and UE2, processing time for receiving an SRS trigger and preparing a corresponding SRS by either multiplexing DL transmissions to the other UE or transmitting dummy data for holding the COT. The processing times between the SRS trigger and the corresponding transmission of the SRS are shown in message exchange 300 by the arrows coupling the triggers to the corresponding SRSs.

After acquiring the COT, the gNB may transmit a first DL transmission that includes first information (SRS trigger UE1—single shot (SS) LBT) to trigger an SRS transmission for UE1 and inform UE1 that it is to use an LBT procedure for the SRS. An SS LBT may also be referred to as Category 2 LBT (as described, for example, in 3GPP Technical Report 38.889 v0.1.0 (2018-09-07), section 8.2). If SRS is triggered for UE1 with SS LBT, then UE1 needs to perform Category 2 LBT and can transmit SRS once LBT is successful.

The first DL transmission may also include second information (PDSCH grant UE2) that is to inform a second UE (UE2) of an upcoming PDSCH transmission. The transmission exchange 300 may then include a second DL transmission that includes the PDSCH for the UE2 (PDSCH UE2). Following PDSCH UE2, the transmission exchange 300 may include a third DL transmission that includes third information (SRS trigger UE2, no LBT) to trigger an SRS transmission for UE2. The third information may also include an indication to inform UE2 that it does not need to use in LDT procedure. In order to allow the SRS Tx from UE2 without LBT, while satisfying processing time requirements for UE2, the gNB may transmit dummy data in a fourth DL transmission. The dummy data is data that is not intended to be processed by any UE. It is only intended to preserve the channel so that another device does not perform a successful LBT procedure and occupy the medium. Immediately following the dummy data, UE2 may send an uplink transmission that includes an SRS (SRS Tx UE2).

There is no guarantee that UE2 will transmit SRS. This may happen, for example, if the UE2 does not receive SRS trigger command. Therefore, there is always a possibility that the medium becomes occupied. Thus, the UE1 may perform a single-shot LBT (as dynamically indicated to the UE1 by the first DL transmission). The transmission exchange 300 illustrates performance of the LBT procedure by the CCA following SRS Tx UE2. Assuming a successful LBT, the UE1 may send an uplink transmission that includes an SRS (SRS Tx UE1).

Note that due to timing advance (TA) and (TA) differences across UEs, the timing of the symbols and slots in practice are a little different but the same principle holds.

Figure 4:
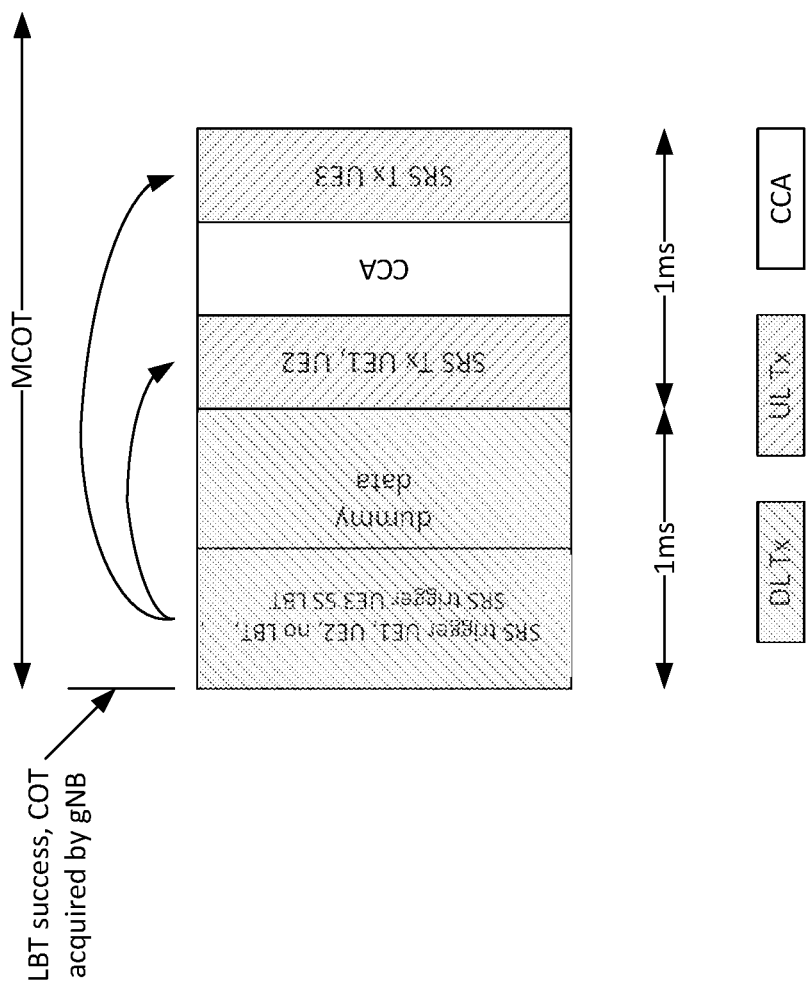
FIG. 4 illustrates a transmission exchange in accordance with some embodiments.

FIG. 4 is a transmission exchange 400 that illustrates an SRS triggering mechanism in accordance with some embodiments. Similar to transmission exchange 300, the transmission exchange 400 provides an SRS triggering mechanism in which UEs are informed of the type of LBT that is associated for a particular instance of the SRS transmission. Transmission exchange 400 also multiplexes multiple UEs for SRS transmission.

After acquiring the COT, the gNB may transmit a first DL transmission that includes first information (SRS trigger UE1, UE2, no LBT, SRS trigger UE3 SS LBT) to trigger an SRS transmission for three UEs, UE1, UE2, and UE3. The first information may trigger the first two UEs, UE1 and UE2, to transmit SRSs during the same uplink transmission opportunity without using an LBT procedure. The first information may trigger the last UE, UE3, to transmit an SRS in another uplink transmission opportunity after performing an LBT procedure. The transmission exchange 400 may include the gNB transmitting a second DL transmission with dummy data to preserve the channel prior to the SRSs being transmitted by UE1 and UE2. Before UE3 transmits its SRS, as SRS Tx UE3, it may perform an LBT procedure (CCA) to ensure that the channel is clear.

Triggering Methods for HARQ

Figure 5:
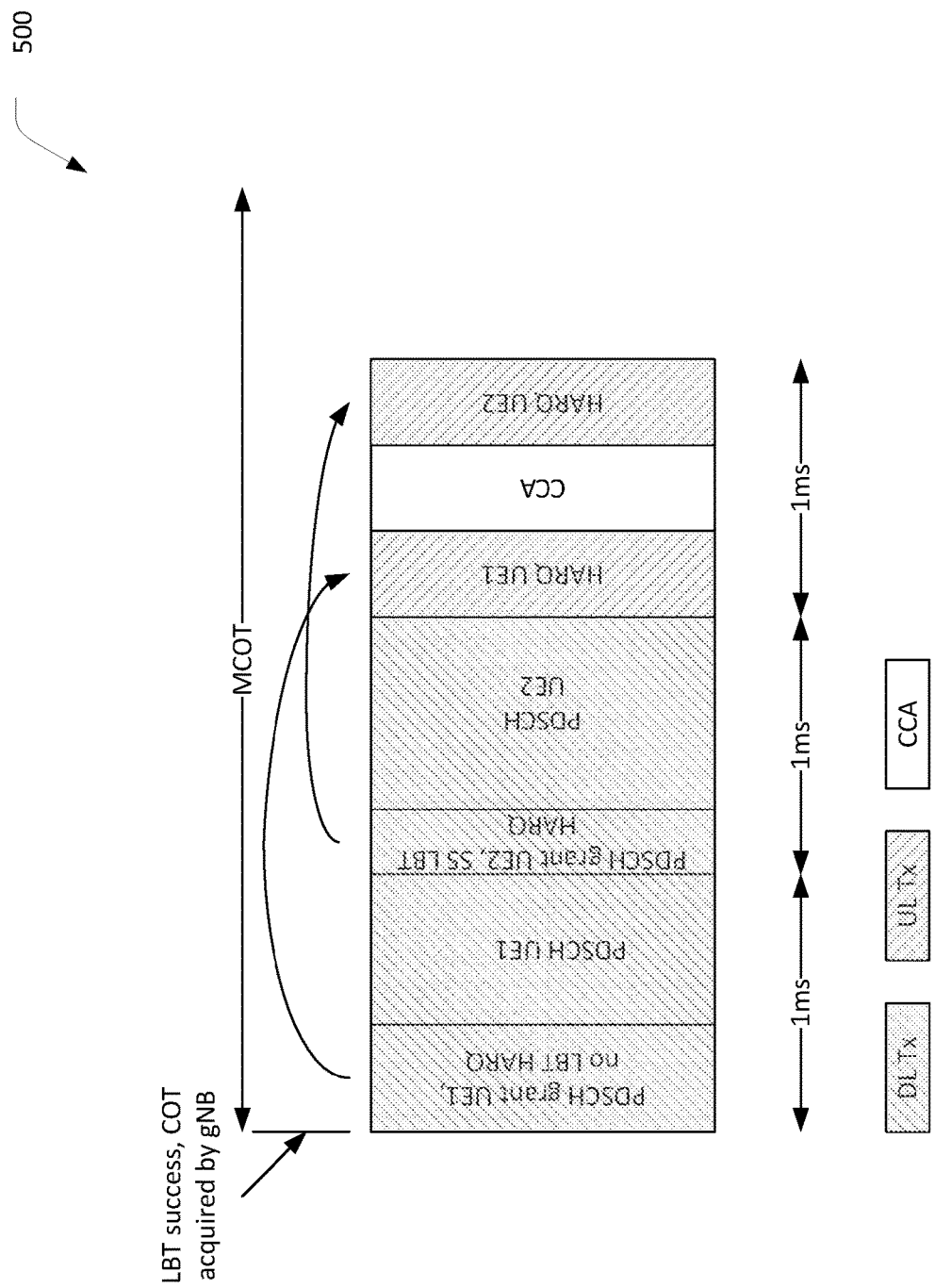
FIG. 5 illustrates a transmission exchange in accordance with some embodiments.

FIG. 5 is a transmission exchange 500 that illustrates triggering a HARQ transmission in accordance with some embodiments. In transmission exchange 500, UEs are informed of the type of LBT that is associated for a particular instance of HARQ transmission in a manner analogous to transmission exchanges 300 and 400.

The transmission exchange 500 may begin by the gNB acquiring a COT shared with UE1 and UE2 for DL and UL transmissions. UE processing time (as shown by coupling arrows) for receiving the PDSCH grant and preparing HARQ corresponding to the related PDSCH is provided to UE1 by multiplexing DL transmissions to UE2. UE processing time can also be provided by transmitting dummy data for holding the COT.

After the gNB acquires the COT, the transmission exchange 500 may include the gNB sending a first DL transmission (PDSCH grant UE1, no LBT HARQ) to inform the UE1 of a PDSCH grant and to further inform the UE1 that no LBT procedures are needed prior to sending HARQ information that corresponds to the PDSCH. The transmission exchange 500 may further include the gNB sending the PDSCH to the UE1 in a second DL transmission (PDSCH UE1).

After sending the PDSCH UE1, the gNB sends a third DL transmission (PDSCH grant UE2, SS LBT HARQ) to inform the UE2 of a PDSCH grant and to further inform the UE2 that a LBT procedure is to be performed prior to sending HARQ information that corresponds to the PDSCH. Following the third DL transmission, the gNB may send a fourth DL transmission that includes the PDSCH for the UE2 (PDSCH UE2).

UE1, upon receiving the PDSCH UE1, may generate an UL transmission with HARQ that corresponds to PDSCH UE1 (HARQ UE1). The UE1 will not need to perform an LBT procedure as the gNB has ensured that the medium is occupied for the entire time before transmitting HARQ UE1. Thus, the transmission exchange 500 shows that UE1's HARQ Tx can be allowed without LBT while still satisfying its processing time requirements.

UE2, upon receiving PDSCH UE2, may generate an UL transmission with HARQ that corresponds to PDSCH UE2 (HARQ UE2). As previously dynamically indicated to UE2, the UE2 will perform an LBT procedure, CCA, to determine whether the channel is clear. This may be desired as there is no guarantee that UE1 will transmit HARQ UE1 (for example, UE1 does not receive PDSCH grant). Therefore, there is always a possibility that the medium becomes occupied and a single-shot LBT may be desired for HARQ transmission from UE2. Upon successfully performing the CCA, the UE2 may transmit HARQ UE2.

Note that due to TA and TA differences across UEs, the timing of the symbols and slots in practice may be a little different but the same principle holds.

Figure 6:
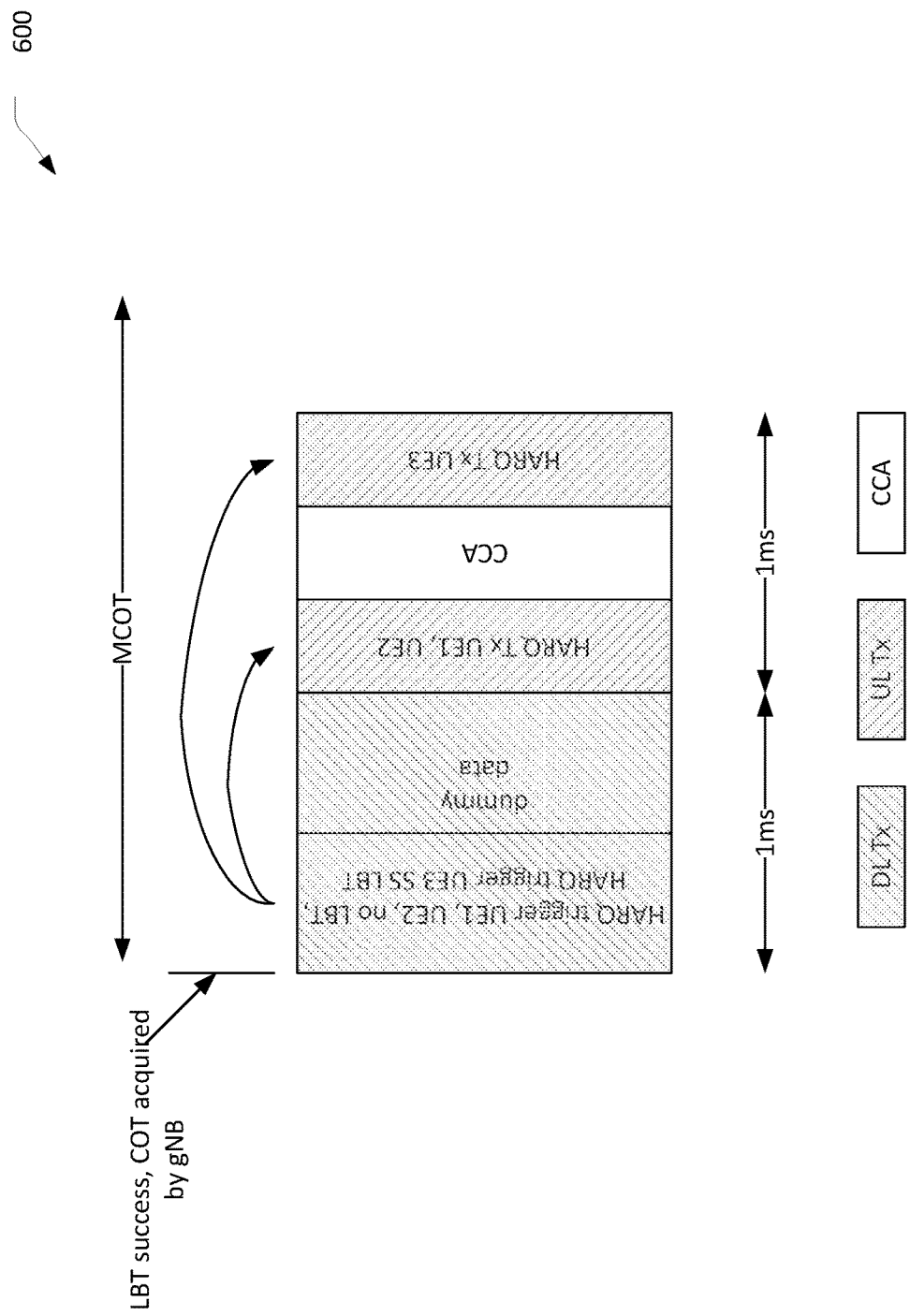
FIG. 6 illustrates a transmission exchange in accordance with some embodiments.

FIG. 6 is a transmission exchange 600 that illustrates triggering a HARQ transmission in accordance with some embodiments. In transmission exchange 600, similar to transmission exchange 500, UEs are informed of the type of LBT that is associated for a particular instance of HARQ transmission. In transmission exchange 600, multiple UEs are multiplexed in CDM/FDM fashion within the same OFDM symbols for HARQ transmission. This is achieved by eliminating LBT requirements for UE1 and UE2, which may be indicated with the HARQ trigger. Also in this case it is considered that PDSCH is transmitted in a different (earlier) COT—therefore PDSCH processing time is not counted towards the UE processing time for HARQ preparation in this case.

After acquiring the COT, the gNB may transmit a first DL transmission (HARQ trigger UE1, UE2 no LBT, HARQ trigger UE3 SS LBT) to inform UE1 and UE2 that they are to transmit their HARQ information, which respectively corresponds to PDSCH UE1 and PDSCH UE2, without an LBT procedure. The first DL transmission may also inform UE3 that it is to transmit its HARQ information, which corresponds to PDSCH UE3, with an LBT procedure.

The gNB may send dummy data after the first DL transmission to preserve the channel before UE1 and UE2 send their multiplexed HARQ information.

After UE1 and UE2 send their HARQ information, UE3 may perform an LBT procedure, CCA, to confirm the channel is clear prior to sending its HARQ information (HARQ Tx UE3).

Figure 7:
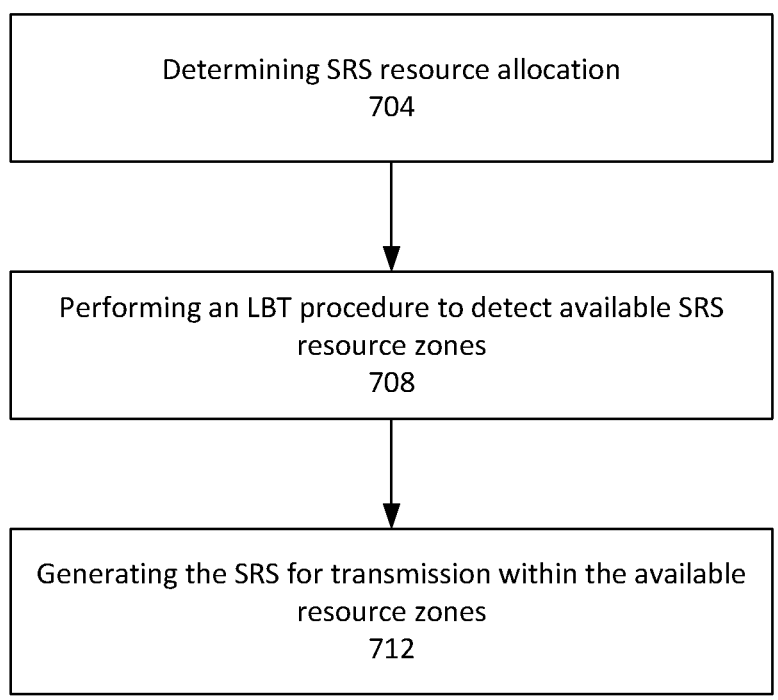
FIG. 7 illustrates an operation flow/algorithmic structure in accordance with some embodiments.

FIG. 7 illustrates an operation flow/algorithmic structure 700 in accordance with some embodiments. The operation flow/algorithmic structure 700 may be performed, in part or in whole, by the UE 105 or components thereof. For example, in some embodiments the operation flow/algorithmic structure 700 may be performed by baseband circuitry implemented in the UE 105.

The operation flow/algorithmic structure 700 may include, at 704, determining an SRS resource allocation. An indication of the SRS resource allocation may be transmitted, from an access node, by higher-layer signaling and may include an indication of a plurality of different SRS resource zones. The resource zones may be bandwidth-based SRS resource zones and include, for example, a range of starting PRBs for individual bandwidth ranges of a plurality of different ranges. In some embodiments, the bandwidth ranges may include same or different number of PRBs, same or different numerology, etc.

In some embodiments, the resource zones may be time-based SRS resource zones and include a plurality of SRS resource zones one or more symbols within a slot. In various embodiments the SRS resource zones may be based on both bandwidth and time and include, for example, different starting symbol indices, different starting PRB indices, etc.

The operation flow/algorithmic structure 700 may further include, at 708, performing an LBT procedure to detect an available bandwidth zone. In some embodiments, the UE may determine a plurality of SRS resource zones are available.

The operation flow/algorithmic structure 700 may further include, at 712, generating the SRS for transmission within the bandwidth range determined to be available at 708. In embodiments in which more than one resource zone is available, the UE may choose which of the plurality of available resource zones to use for an SRS. The UE may also use more than one of the resource zones, whether they are contiguous or non-contiguous in time or frequency.

Figure 8:
FIG. 8 illustrates an operation flow/algorithmic structure in accordance with some embodiments.

FIG. 8 illustrates an operation flow/algorithmic structure 800 in accordance with some embodiments. The operation flow/algorithmic structure 800 may be performed, in part or in whole, by the access node 110 or components thereof. For example, in some embodiments the operation flow/algorithmic structure 800 may be performed by the baseband circuitry implemented in the access node 110.

The operation flow/algorithmic structure 800 may include, at 804, acquiring a channel for a COT for communication with a plurality of UEs. A channel may be acquired by the access node successfully performing an LBT procedure.

The operation flow/algorithmic structure 800 may further include, at 808, configuring a first UE to transmit a first UL transmission with an LBT procedure. In some embodiments, the configuring may include transmitting configuration information to the first UE.

In some embodiments, the first UL transmission may be an SRS transmission that is triggered by the configuration information. In some embodiments, the first UL transmission may be a HARQ transmission and the configuration information may also grant a PDSCH, for which the HARQ transmission is to relate, that is to be transmitted to the UE. In some embodiments, the PDSCH may be scheduled beforehand, and the configuration information transmitted in the COT may just trigger the HARQ and instruct the UE as to whether the LBT is to be performed. The operation flow/algorithmic structure 800 may further include, at 812, configuring a second UE to transmit a second UL transmission without an LBT procedure. The second UL transmission may be similar to the first UL transmission, for example, an SRS transmission or a HARQ transmission.

FIG. 9 illustrates a device 900 including baseband circuitry 910 and radio front end module (RFEM) 915 in accordance with various embodiments. The device may be a UE, for example, UE 105, or an AN, for example, AN 110, in various embodiments.

As shown, the RFEM 915 may include Radio Frequency (RF) circuitry 906, front-end module (FEM) circuitry 908, and one or more antennas 920 coupled together at least as shown.

The baseband circuitry 910 may include circuitry such as, but not limited to, one or more single-core or multi-core processors. The baseband circuitry 910 may include one or more baseband processors or control logic to process baseband signals received from a receive signal path of the RF circuitry 906 and to generate baseband signals for a transmit signal path of the RF circuitry 906. Baseband processing circuitry 910 may interface with the application circuitry 605/705 for generation and processing of the baseband signals and for controlling operations of the RF circuitry 906. For example, in some embodiments, the baseband circuitry 910 may include a third generation (3G) baseband processor 904A, a 4G baseband processor 904B, a 5G baseband processor 904C, or other baseband processor(s) 904D for other existing generations, generations in development or to be developed in the future (e.g., second generation (2G), sixth generation (6G), etc.). The baseband circuitry 910 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/demapping functionality. In some embodiments, encoding/decoding circuitry of the baseband circuitry 910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 910 may include one or more audio digital signal processor(s) (DSP) 904F. The audio DSP(s) 904F may include elements for compression/decompression and echo cancellation and may include other suitable processing elements in other embodiments. Components of the baseband circuitry may be suitably combined in a single chip or a single chipset, or disposed on a same circuit board in some embodiments. In some embodiments, some or all of the constituent components of the baseband circuitry 910 and application circuitry may be implemented together such as, for example, on a system on a chip (SOC).

In some embodiments, the baseband circuitry 910 may provide for communication compatible with one or more radio technologies. For example, in some embodiments, the baseband circuitry 910 may support communication with an E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

FEM circuitry 908 may include a receive signal path, which may include circuitry configured to operate on RF signals received from one or more antennas 920, amplify the received signals and provide the amplified versions of the received signals to the RF circuitry 806 for further processing. FEM circuitry 908 may also include a transmit signal path, which may include circuitry configured to amplify signals for transmission provided by the RF circuitry 906 for transmission by one or more of the one or more antennas 920. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 808 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 920).

Processors of the baseband circuitry 910 may be used to execute elements of one or more instances of a protocol stack. For example, processors of the baseband circuitry 910, alone or in combination, may be used execute Layer 3, Layer 2, or Layer 1 functionality, while processors of application circuitry may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

FIG. 10 illustrates example interfaces of baseband circuitry 910 in accordance with various embodiments. As discussed above, the baseband circuitry 910 of FIG. 9 may comprise processors 904A-904E and a memory 904G utilized by said processors. Each of the processors 904A-904E may include a memory interface, 1004A-1004E, respectively, to send/receive data to/from the memory 904G.

The baseband circuitry 910 may further include one or more interfaces to communicatively couple to other circuitries/devices, such as a memory interface 1012 (e.g., an interface to send/receive data to/from memory external to the baseband circuitry 910), an application circuitry interface 1014 (e.g., an interface to send/receive data to/from the application circuitry), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from power management integrated circuit).

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. As used herein, the term "computing resource," "hardware resource," etc., may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1102 may be executed to provide an execution environment for one or more network slices/sub-slices to utilize the hardware resources 1100. A "virtualized resource" may refer to compute, storage, and/or network resources provided by virtualization infrastructure to an application, device, system, etc.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1114.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1030 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1150 may comprise software, a program, an application, an applet, an app, or other executable code for causing at least any of the processors 1110 to perform any one or more of the methodologies discussed herein. For example, the instructions may be executed by one or more of the processors 1110 to perform SRS and HARQ transmission and LBT procedures as described.

The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a method of operating a UE, the method comprising: determining sounding reference signal (SRS) resource allocation information to configure uplink resources for an SRS, the uplink resources to include a plurality of bandwidth ranges within a sounding bandwidth; performing a listen-before-talk (LBT) procedure in individual bandwidth ranges of the plurality of bandwidth ranges to detect at least one bandwidth range available for the SRS; and generating the SRS for transmission within the at least one bandwidth range.

Example 2 includes a method of example 1 or some other example herein, wherein to determine the SRS resource allocation information, the UE is to process downlink control information or a radio resource control signal that includes the SRS resource allocation information.

Example 3 includes the method of example 1 or some other example herein, wherein the SRS resource allocation information is to include an indication of a range of starting physical resource block (PRBs) for individual bandwidth ranges of the plurality of different bandwidth ranges.

Example 4 includes the method of example 3 or some other example herein, wherein the SRS resource allocation information is to include an indication of a first range of starting PRBs for a first bandwidth range of the plurality of bandwidth ranges, and a second range of starting PRBs for a second bandwidth range of the plurality of bandwidth ranges, wherein the first range is different from the second range.

Example 5 includes the method of example 1 or some other example herein, wherein a first bandwidth range of the plurality of bandwidth ranges includes a first numerology and a second bandwidth range of the plurality of bandwidth range includes a second numerology that is different from the first numerology.

Example 6 includes the method of example 1 or some other example herein, wherein at least two of the plurality of bandwidth ranges includes a common numerology.

Example 7 includes a method of example 1 or some other example herein, further comprising generating the SRS as a periodic SRS, a semi-persistent SRS, or an aperiodic SRS that spans one or more symbols located in a beginning portion of a subframe.

Example 8 includes the method of example 1 or some other example herein, further comprising determining, based on the LBT procedure, a plurality of bandwidth ranges are available for the SRS; selecting one bandwidth range of the plurality of bandwidth ranges that are available; and generating the SRS for transmission within the one bandwidth range.

Example 9 includes the method of example 1 or some other example herein, further comprising: determining, based on the LBT procedure, a plurality of bandwidth ranges are available for the SRS; and generating the SRS for transmission within the plurality of bandwidth ranges that are available.

Example 10 includes the method of example 8 or 9 or some other example herein, wherein the plurality of bandwidth ranges that are available or contiguous or non-continguous.

Example 11 includes a method of operating a UE, the method comprising: receiving a downlink control signal having sounding reference signal (SRS) resource allocation information to configure a plurality of SRS resource zones over one or more symbols within a slot; performing a listen-before-talk (LBT) procedure in individual SRS resource zones of the plurality of SRS resource zones to detect at least one SRS resource zone for the SRS; and generating the SRS for transmission within the at least one SRS resource zone.

Example 12 includes the method of example 11 or some other example herein, wherein each of the plurality of SRS resource zones are associated with different starting symbol indices within the slot.

Example 13 includes the method of example 12 or some other example herein, wherein each of the plurality of resource zones are associated with different starting physical resource block (PRB) indices.

Example 14 includes the method of example 11 or some other example herein, wherein at least two of the plurality of resource zones include a same starting symbol index and different starting physical resource block (PRB) indices.

Example 15 includes the method of example 11 or some other example herein, further comprising generating the SRS for transmission in a starting symbol location that is any symbol within the slot and is based on an ending time of the LBT procedure.

Example 16 includes the method of example 11 or some other example herein, further comprising generating the SRS for transmission in a symbol that starts immediately after the LBT procedure ends.

Example 17 includes method of example 11 or some other example herein, further comprising determining, based on implicit or explicit signaling, ending symbol locations for individual SRS resource zones of the plurality of SRS resource zones.

Example 18 includes the method of example 11 or some other example herein, further comprising determining, based on the LBT procedure, a starting symbol and an ending symbol to establish a reduced SRS duration; and puncturing the SRS for transmission to fit within the reduced SRS duration.

Example 19 includes a method of operating an access node, the method comprising acquiring a channel occupancy time (COT) for communication with a plurality of user equipments (UEs); and generating one or more configuration messages to: configure a first UE of the plurality of UEs to transmit, within the COT, a first uplink transmission without using a listen-before-talk (LBT) procedure; and configure a second UE of the plurality of UEs to transmit, within the COT, a second uplink transmission after using an LBT procedure.

Example 20 includes the method of example 19 or some other example herein, wherein the first and second uplink transmissions are first and second sounding reference signal (SRS) transmissions.

Example 21 includes the method of example 20 or some other example herein, further comprising generating dummy data to be transmitted within the COT to keep a channel before the first UE is to transmit the first SRS transmission.

Example 22 includes a method of example 21 or some other example herein, wherein the one or more configuration messages includes an SRS trigger to be sent to the first UE to configure the first UE to transmit the first SRS transmission, wherein the dummy data is to be transmitted for a duration between transmission of the SRS trigger by the access node and transmission of the first SRS transmission by the first UE.

Example 23 includes method of example 19 or some other example herein, wherein the first and second uplink transmissions are first and second hybrid-automatic repeat request (HARQ) transmissions.

Example 24 includes the method of example 19 or some other example herein, wherein the LBT procedure includes a clear channel assessment.

Example 25 may include an apparatus comprising means to perform one or more elements of a method described in or related to any of examples 1-24, or any other method or process described herein.

Example 26 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 27 may include an apparatus comprising logic, modules, or circuitry to perform one or more elements of a method described in or related to any of examples 1-24, or any other method or process described herein.

Example 28 may include a method, technique, or process as described in or related to any of examples 1-24, or portions or parts thereof.

Example 29 may include an apparatus comprising: one or more processors and one or more computer readable media comprising instructions that, when executed by the one or more processors, cause the one or more processors to perform the method, techniques, or process as described in or related to any of examples 1-24, or portions thereof.

Example 30 may include a signal as described in or related to any of examples 1-24, or portions or parts thereof.

Example 31 may include a signal in a wireless network as shown and described herein. Example 32 may include a method of communicating in a wireless network as shown and described herein.

Example 33 may include a system for providing wireless communication as shown and described herein.

Example 34 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory computer-readable media having instructions that, when executed by one or more processors, cause a user equipment (UE) to:
    determine sounding reference signal (SRS) resource allocation information to configure uplink resources for an SRS, the uplink resources to include a plurality of bandwidth ranges within a sounding bandwidth;
    perform a listen-before-talk (LBT) procedure in individual bandwidth ranges of the plurality of bandwidth ranges to detect at least one bandwidth range available for the SRS; and
    generate the SRS for transmission within the at least one bandwidth range, wherein the SRS comprises a periodic SRS, a semi-persistent SRS, or an aperiodic SRS that spans one or more symbols located in a beginning portion of a subframe.

2. The one or more non-transitory computer-readable media of claim 1, wherein to determine the SRS resource allocation information, the instructions, when executed, cause the UE is to process downlink control information or a radio resource control signal that includes the SRS resource allocation information.

3. The one or more non-transitory computer-readable media of claim 1, wherein the SRS resource allocation information is configured to include an indication of a range of starting physical resource block (PRBs) for individual bandwidth ranges of the plurality of bandwidth ranges.

4. The one or more non-transitory computer-readable media of claim 3, wherein the SRS resource allocation information is configured to include an indication of a first range of starting PRBs for a first bandwidth range of the plurality of bandwidth ranges, and a second range of starting PRBs for a second bandwidth range of the plurality of bandwidth ranges, wherein the first range is different from the second range.

5. The one or more non-transitory computer-readable media of claim 1, wherein a first bandwidth range of the plurality of bandwidth ranges includes a first numerology and a second bandwidth range of the plurality of bandwidth ranges includes a second numerology that is different from the first numerology.

6. The one or more non-transitory computer-readable media of claim 1, wherein at least two of the plurality of bandwidth ranges include a common numerology.

7. The one or more non-transitory computer-readable media of claim 1, wherein the instructions, when executed, further cause the UE to:
    determine, based on the LBT procedure, a plurality of bandwidth ranges are available for the SRS;
    select the at least one bandwidth range of the plurality of bandwidth ranges that are available; and
    generate the SRS for transmission within the at least one bandwidth range.

8. The one or more non-transitory computer-readable media of claim 1, wherein the instructions, when executed, further cause the UE to:
    determine, based on the LBT procedure, a plurality of bandwidth ranges are available for the SRS; and
    generate the SRS for transmission within the plurality of bandwidth ranges that are available, wherein the plurality of bandwidth ranges that are available are contiguous or non-contiguous.

9. A user equipment (UE), comprising:
interface circuitry configured to receive a downlink control signal having sounding reference signal (SRS) resource allocation information to configure a plurality of SRS resource zones over one or more symbols within a slot; and
processing circuitry configured to:
perform a listen-before-talk (LBT) procedure in individual SRS resource zones of the plurality of SRS resource zones to detect at least one SRS resource zone for an SRS; and
generate the SRS for transmission within the at least one SRS resource zone, wherein the SRS comprises a periodic SRS, a semi-persistent SRS, or an aperiodic SRS that spans one or more symbols located in a beginning portion of a subframe.

10. The UE of claim 9, wherein each of the plurality of SRS resource zones are associated with different starting symbol indices within the slot.

11. The UE of claim 10, wherein each of the plurality of SRS resource zones are associated with different starting physical resource block (PRB) indices.

12. The UE of claim 9, wherein at least two of the plurality of SRS resource zones include a same starting symbol index and different starting physical resource block (PRB) indices.

13. The UE of claim 9, wherein the processing circuitry is further configured to generate the SRS for transmission in a starting symbol location that is any symbol within the slot and is based on an ending time of the LBT procedure.

14. The UE of claim 9, wherein the processing circuitry is further configured to generate the SRS for transmission in a symbol that starts immediately after the LBT procedure ends.

15. The UE of claim 9, wherein the processing circuitry is further configured to determine, based on implicit or explicit signaling, ending symbol locations for individual SRS resource zones of the plurality of SRS resource zones.

16. The UE of claim 9, wherein the processing circuitry is further configured to: determine, based on the LBT procedure, a starting symbol and an ending symbol to establish a reduced SRS duration; and puncture the SRS for transmission to fit within the reduced SRS duration.

17. A method, comprising:
determining, by a user equipment (UE), sounding reference signal (SRS) resource allocation information to configure uplink resources for an SRS, the uplink resources to include a plurality of bandwidth ranges within a sounding bandwidth;
performing a listen-before-talk (LBT) procedure in individual bandwidth ranges of the plurality of bandwidth ranges to detect at least one bandwidth range available for the SRS; and
generating the SRS for transmission within the at least one bandwidth range, wherein the SRS comprises a periodic SRS, a semi-persistent SRS, or an aperiodic SRS that spans one or more symbols located in a beginning portion of a subframe.

18. The method of claim 17, further comprising:
determining, based on the LBT procedure, a plurality of bandwidth ranges that are available for the SRS;
selecting the at least one bandwidth range of the plurality of bandwidth ranges that is available; and
generating the SRS for transmission within the at least one bandwidth range.

19. The method of claim 17, further comprising:
determining, based on the LBT procedure, a plurality of bandwidth ranges that are available for the SRS; and
generating the SRS for transmission within the plurality of bandwidth ranges that are available, wherein the plurality of bandwidth ranges that are available are contiguous or non-contiguous.

* * * * *